(12) United States Patent
Fishman

(10) Patent No.: US 10,375,009 B1
(45) Date of Patent: Aug. 6, 2019

(54) AUGMENTED REALITY BASED SOCIAL NETWORK WITH TIME LIMITED POSTING

(71) Applicant: Richard Fishman, Parkland, FL (US)

(72) Inventor: Richard Fishman, Parkland, FL (US)

( * ) Notice: Subject to any disclaimer, the term of this patent is extended or adjusted under 35 U.S.C. 154(b) by 0 days.

(21) Appl. No.: 16/191,512

(22) Filed: Nov. 15, 2018

Related U.S. Application Data

(60) Provisional application No. 62/744,155, filed on Oct. 11, 2018.

(51) Int. Cl.
| | | |
|---|---|---|
| *G06T 19/00* | (2011.01) | |
| *H04L 12/58* | (2006.01) | |
| *G06T 11/60* | (2006.01) | |
| *G06T 19/20* | (2011.01) | |
| *H04L 29/06* | (2006.01) | |
| *G06Q 10/10* | (2012.01) | |
| *H04L 12/14* | (2006.01) | |
| *H04L 29/08* | (2006.01) | |
| *G06Q 50/00* | (2012.01) | |

(52) U.S. Cl.
CPC .......... *H04L 51/32* (2013.01); *G06Q 10/101* (2013.01); *G06T 11/60* (2013.01); *G06T 19/006* (2013.01); *G06T 19/20* (2013.01); *H04L 12/1439* (2013.01); *H04L 67/18* (2013.01); *H04L 67/38* (2013.01); *G06Q 50/01* (2013.01); *G06T 2219/024* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,965,460 B1 | 2/2015 | Rao et al. | |
| 9,380,177 B1 | 6/2016 | Rao et al. | |
| 9,607,025 B2 | 3/2017 | Dirienzo | |
| 2013/0084012 A1* | 4/2013 | Murphy | G06K 9/00671 |
| | | | 382/190 |
| 2014/0002643 A1 | 1/2014 | Aziz et al. | |
| 2014/0236903 A1 | 8/2014 | Dirienzo | |
| 2014/0254896 A1 | 9/2014 | Zhou et al. | |
| 2014/0347391 A1* | 11/2014 | Keane | G06T 19/006 |
| | | | 345/633 |

(Continued)

FOREIGN PATENT DOCUMENTS

| | | |
|---|---|---|
| CN | 105164686 A | 12/2015 |
| KR | 1020120046552 A | 5/2012 |

(Continued)

*Primary Examiner* — Ryan M Gray
(74) *Attorney, Agent, or Firm* — Gearhart Law LLC.

(57) ABSTRACT

An augmented reality based social network is described. In an example scenario, an augmented reality (AR) service stores user generated upon receiving the content from the user. The content includes two and/or three article(s). The AR service also receives a selected location from the user as another input. The user content is next processed for an overlay on the selected location. The user content is subject to an expiration after an initial time period. In addition, the user content is provided for a presentation on an AR display in relation to the selected location. An evaluation of the user content is also received from a viewer viewing the user content on the AR display. The time period is extended or reduced based on the evaluation.

14 Claims, 6 Drawing Sheets

(56) References Cited

U.S. PATENT DOCUMENTS

| | | | | |
|---|---|---|---|---|
| 2015/0309705 A1* | 10/2015 | Keeler | ............... | G06N 7/005 |
| | | | | 705/27.2 |
| 2016/0005106 A1 | 1/2016 | Giraldez et al. | | |
| 2016/0295038 A1 | 10/2016 | Rao et al. | | |
| 2016/0330522 A1* | 11/2016 | Newell | ............... | G06F 21/604 |
| 2017/0038829 A1* | 2/2017 | Lanier | ............... | H04L 65/403 |
| 2017/0124713 A1* | 5/2017 | Jurgenson | ............ | G06T 19/006 |
| 2017/0185606 A1 | 6/2017 | Dirienzo | | |
| 2017/0221272 A1* | 8/2017 | Li | ............... | G06T 19/006 |
| 2018/0018827 A1* | 1/2018 | Stafford | ............ | A63F 13/211 |
| 2018/0089904 A1* | 3/2018 | Jurgenson | ............ | G06T 19/006 |
| 2018/0114364 A1* | 4/2018 | McPhee | ............ | A63F 13/211 |
| 2018/0114365 A1* | 4/2018 | Egri | ............... | G06T 19/006 |
| 2018/0204382 A1 | 7/2018 | Simpson | | |
| 2018/0210628 A1* | 7/2018 | McPhee | ............ | G06F 3/04815 |
| 2018/0253901 A1* | 9/2018 | Charlton | ............ | G06T 19/006 |
| 2018/0286126 A1* | 10/2018 | Schwarz | ............ | G06F 3/011 |
| 2018/0376205 A1* | 12/2018 | Oswal | ............ | G06F 16/783 |
| 2019/0012730 A1* | 1/2019 | Keeler | ............... | G06N 7/005 |

FOREIGN PATENT DOCUMENTS

| | | | |
|---|---|---|---|
| WO | 2014122253 | A2 | 8/2014 |
| WO | 2015177760 | A2 | 11/2015 |
| WO | 2016005799 | A1 | 1/2016 |
| WO | 2018014338 | A1 | 1/2018 |
| WO | 2018104834 | A1 | 6/2018 |

\* cited by examiner

AUGMENTED REALITY BASED SOCIAL NETWORK WITH TIME LIMITED POSTING

CLAIM OF PRIORITY

This application is a United States non-provisional application and claims priority to U.S. provisional patent application No. 62/744,155, filed Oct. 11, 2018, the entire contents of which are incorporated herein by reference.

FIELD OF THE EMBODIMENTS

The field of the embodiments relate to a system to provide an augmented reality based social network with time limited posting. A user generated content may be overlaid on a surface of a structure at a selected location. The user content may be subject to an expiration after a time period. The time period may be extended or reduced based on a number of approvals or disapprovals associated with the user content.

BACKGROUND OF THE EMBODIMENTS

Information exchange have changed processes associated work and personal environments. Automation and improvements in processes have expanded scope of capabilities offered for personal and business data consumption. With the development of faster and smaller electronics, execution of mass processes at cloud systems have become feasible. Indeed, applications provided by data centers, data warehouses, data workstations have become common features in modern personal and work environments. Augmented reality based service(s) provide a wide variety of applications ranging from hosting, management, and/or presentation of user content overlaid on real world structures in relation to a social network.

The social network is an information collective that is enabled by modern advances in technology. The social network provides an ability to capture, analyze, classify, and present information associated with individuals that make up members of the social network. The personal information of the members is integrated and presented as the social network. The user content may also be integrated with the social network for dissemination in an augmented reality based application. User content associated presented through an augmented reality mechanism may be integrated with a social network in a variety of ways. Below are some examples of social networking systems that integrate augmented reality based user content.

U.S. Pat. No. 8,965,460 B1 pertains to a mobile communication system based on digital content including images and video that may be acquired, processed, and displayed using a plurality of mobile device, smartphones, tablet computers, stationary computers, intelligent electronic glasses, smart glasses, headsets, watches, smart devices, vehicles, and servers.

U.S. Pub. 2014/002643A1 pertains to methods and systems providing a presentation of augmented reality images on mobile computing devices.

International Pub. WO2016005799A1 pertains to a method for sharing and displaying user content in a social networking system for a user on a programmable user device.

International Pub. WO2018104834A1 pertains to real-time, ephemeral, single mode, group & auto taking visual media, stories, auto status, following feed types, mass actions, suggested activities, augmented reality media & platform.

None of the art described above addresses all of the issues that the present invention does.

SUMMARY OF THE EMBODIMENTS

The present invention and its embodiments relate to an augmented reality based social network with time limited posting. A system may provide the augmented reality based social network with time limited posting. The system may include an augmented reality server. The augmented reality server may be configured to receive and store a content generated by a user. A selected location may also be received from the user as an input. Next, the user content may be processed for an overlay on the selected location. The user content may be subject to an expiration after an initial time period. Furthermore, the user content may be provided for a presentation on an augmented reality display in relation to the selected location. An initial evaluation of the user content may also be received from an initial viewer viewing the user content on the augmented reality display. The initial time period may be extended or reduced based on the initial evaluation.

In another embodiment of the present invention, an augmented reality server for providing an augmented reality based social network with time limited posting is described. The augmented reality server may include a rendering component configured to render a commercial content. A memory may be configured to store instructions associated with an augmented reality service. A processor may be coupled to the rendering component and the memory. The processor may execute the instructions associated with the augmented reality service. The augmented reality service may include a rendering engine. The rendering engine may be configured to receive and store the commercial content. A selected location may also be received in relation to the commercial content. The commercial content may next be processed for an overlay on the selected location. The commercial content may be subject to an expiration after an initial time period. Furthermore, the commercial content may be provided for a presentation on an augmented reality display in relation to the selected location.

In yet another embodiment of the present invention, an augmented reality based social network with time limited posting is described. The method may include receiving and storing a user content provided by a user. A selected location may also be received from the user as another input. The user content may next be processed for an overlay on the selected location. The user content may be subject to an expiration time. Furthermore, the user content may be provided for a presentation on an augmented reality display in relation to the selected location. In addition, an evaluation of the user content may be received from a viewer using the augmented reality display. In response, the expiration time may be expanded or reduced based on the evaluation. Moreover, an update to the user content may be received from the viewer. The user may be queried to confirm or reject the update. The user content may be revised with the update based on a response from the user.

It is an object of the embodiments of the present invention to provide an augmented reality based social network with time limited posting.

It is an object of the embodiments of the present invention to allow a user to upload a content generated by the user for overlay on a selected location.

It is an object of the embodiments of the present invention to render the user content for overlay on the selected location.

It is an object of the embodiments of the present invention to provide the user content for a presentation at the selected location on an augmented reality display when a viewer is at the selected location.

It is an object of the embodiments of the present invention to present the user content subject to an expiration after a time period.

It is an object of the embodiments of the present invention to extend or reduce the time period based on an evaluation by the viewer.

These and other features, aspects and advantages of the present invention will become better understood with reference to the following drawings, description and claims.

DESCRIPTION OF THE PREFERRED EMBODIMENTS

Figure 1:
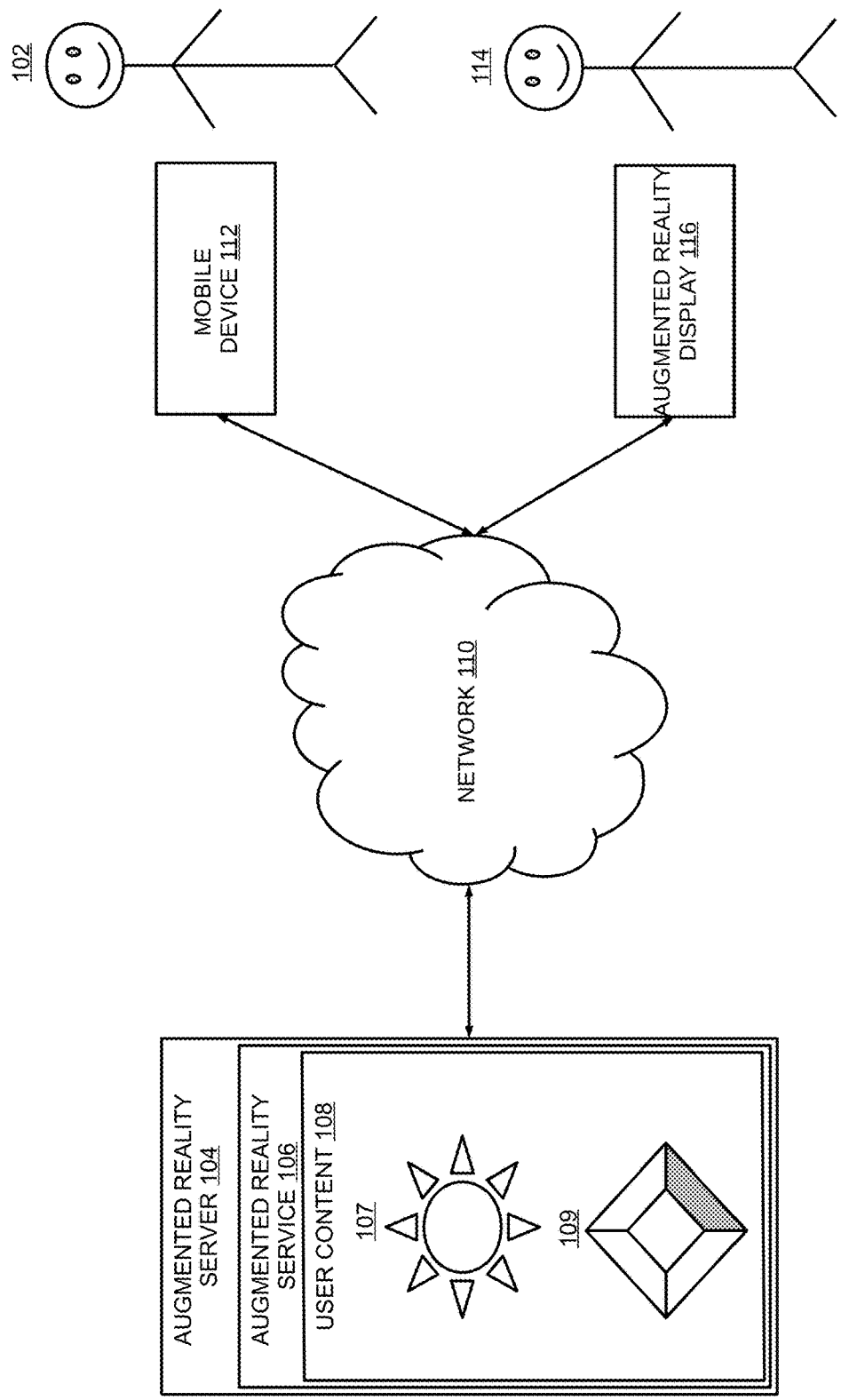
FIG. 1 shows a conceptual diagram illustrating examples of providing an augmented reality based social network with time limited posting, according to an embodiment of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations may be made thereto.

FIG. 1 shows a conceptual diagram illustrating examples of providing an augmented reality based social network with time limited posting. In an example scenario, an augmented reality (AR) server 104 may execute (or provide) an AR service 106. The AR server 104 may include a physical server providing service(s), application(s), and/or an interface to client devices. A service (such as the AR service 106) may include an application performing operations in relation to a client application and/or a subscriber, among others. The AR server 104 may include and/or is part of a workstation, a data warehouse, a data center, and/or a cloud based distributed computing source, among others.

In an example scenario, the AR server 104 may execute the AR service 106. The AR service 106 may receive and store a user content 108 generated by a user 102. The user content 108 may include a two dimensional article 107 and/or a three dimensional article 109. The user 102 may interact with a client application executed on a mobile device 112 to generate and upload the user content 108 to the AR service 106. The client application may include a client interface of the AR service 106. Alternatively, the user 102 may interact with a standalone application (provided by the mobile device 112) that interacts with the AR service 106.

The user 102 may provide a selected location as an input to the AR service 106. The user 102 may intend to overlay the user content 108 on the selected location. Next, the user content 108 may be processed for overlay on the selected location. For example, the user content 108 may be processed for a presentation in which the user content 108 is overlaid on a surface of a structure at the selected location. A rendering component of the AR server 104 may process the user content 108. An example of the rendering component may include one or more graphics processing unit(s). Information associated with a placement of the user content 108 on the surface of the structure may be manually provided by the user 102 as an attribute of the selected location. Alternatively, the AR service 106 may automatically determine the placement of the user content 108 at the selected location.

The user content 108 may also be subject to an expiration after an time period. The time period may be a configuration setting associated with the AR service 106. Alternatively, the time period may be adjustable by a stakeholder associated with the AR service 106 based on a variety of criteria such a type of the user content 108. For example, the two dimensional article 107 may be subject to the time period that is different than the time period applied to the three dimensional content 109.

The user content 108 may next be provided for a presentation to a viewer 114 through an AR display 116 in relation to the selected location. In an example scenario, the viewer 114 may be at the selected location and viewing the selected location on the AR display 116 (such as a smart phone and/or AR glasses, among other AR display devices). The AR service 106 may provide the user content 108 overlaid on the selected location to the AR display 116 for a presentation to the viewer 114.

Upon viewing the user content 108 at the selected location, the viewer 114 may evaluate the user content 108. An evaluation of the user content 108 may be received from the viewer 114. The evaluation may include a positive evaluation or a negative evaluation of the user content 108. In response, the time period may be extended or reduced based on the evaluation.

The AR server 104 may communicate with the mobile device 112 and the AR display 116 through a network 110. The network 110 may provide wired or wireless communications between network nodes such as the mobile device 112, the AR display 116, and/or the AR server 104, among others. Previous example(s) to provide an augmented reality based social network with time limited posting are not provided in a limiting sense. Alternatively, the AR service 106 may host and render the user content 108 overlaid on the selected location and provide the user content 108 for a presentation by the AR display 116 as a desktop application, a workstation application, and/or a server application, among others. Client applications executed by the mobile device 112 and/or the AR display 116 may also include client interface(s) of (or interacting with) the AR service 106.

The user 102 and/or the viewer 114 may interact with the client application(s) on the mobile device 112 and/or the AR display 116 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the AR server 104, the AR service 106, embodiments are not limited to these components or system configurations and can be implemented with other system configuration employing fewer or additional components.

Figure 2:
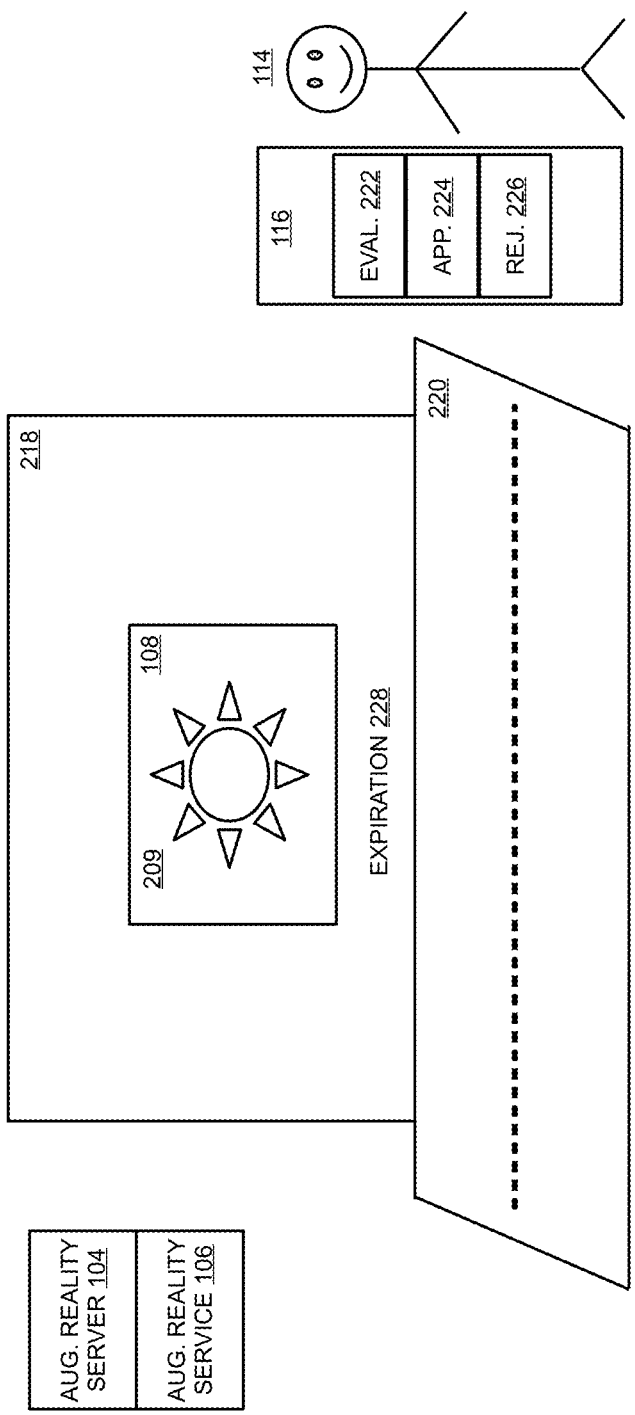
FIG. 2 shows a display diagram illustrating a two dimensional user generated content that is overlaid on a structure and subject to an expiration, according to an embodiment of the invention.

FIG. 2 shows a display diagram illustrating a two dimensional user generated content that is overlaid on a structure and subject to an expiration. In an example scenario, the viewer 114 may be situated at a selected location 220. The selected location 220 may be an input provided by the user. The selected location may include mapping coordinates or a street address. The mapping coordinates (or the street address0 may be provided by the user or determined automatically in response to the user selecting a point on a digital map. Furthermore, the selected location 220 may include a structure (such as a road, a parking lot, a building, a bridge, and/or similar ones). The selected location 220 may include an entirety of the structure or a section of the structure.

In an example scenario, the selected location 220 may be determined automatically. The AR service 106 (executed by the AR server 104) may determine the selected location 220 from image(s) provided by the user that show an area surrounding the selected location 220. For example, the selected location 220 (a section of a street) may be determined (with image, object, and location recognition based processing) from a picture of the street signs and the section of the street.

The user may specify a placement of the user content 108 at the selected location 220 within information associated with the selected location 220. For example, the user may specify that the user content 108 may be placed on a surface of a structure 218 located at the selected location 220.

Furthermore, the AR service 106 may automatically locate where to position the user content 108. In an example scenario, the AR service 106 may evaluate a number of criteria associated with the selected location 220. The criteria may include a flow and/or a direction of foot or vehicle traffic going through or in proximity to the selected location 220. Image and/or sensor information associated with the selected location 220 may be processed to recognize the foot and/or vehicle traffic associated with the selected location 220. Next the AR service 106 may determine the structure 218 as an optimal placement for the user content 108. The optimal placement may include a position nearest to the foot and/or vehicle traffic. A surface of the structure 218, that faces the foot and/or vehicle traffic, may be selected to overlay the user content 108 as the optimal placement.

The user content 108 may include a two dimensional article. The two dimensional article may include a number of items such as a text, a drawing, an image, an animation, an audio stream, and/or a video stream, among others. Furthermore, the two dimensional article may be rendered on a flat plane 209. In an example scenario, a placement of the two dimensional article is fixed in relation to the surface of the structure 218 at the selected location 220. For example, the flat plane 209 (that includes the user content 108) may be rendered on the surface of the wall that borders a section of a street. As such, the user content 108 may be rendered to be stationary in relation to the surface of the structure 218, regardless of whether the viewer 114 changes his or her position in relation to the structure 218.

Alternatively, the two dimensional article may be positioned in between the viewer 114 and the surface of the structure 218 at the selected location 220. The flat plane 209 may be rotated to face the viewer 114 when the viewer 114 changes his or her position in relation to the structure 218. For example, as the viewer 114 walks around the wall (as an example of the structure 218), the rendered position of the flat plane 209 changes along with the viewer 114. As such, the user content 108 is rendered to appear in between the viewer 114 and the wall, as the viewer 114 changes his or her position around the wall.

In another example embodiment, the user content 108 is subject to an expiration 228 after a time period. The time period may be a default system setting that may be configurable by a stakeholder associated with the AR service (such as an administrator, among others). Furthermore, the time period may also change based on a type of the user content 108. For example, a two dimensional article may be subject to an initial time period while a three dimensional article may be subject to another time period. The time period may also be dependent on a complexity associated with the user content 108. For example, the user content 108 with more components and detail may be subject to a longer time period compared to another user content with less components and/or detail.

The time period may also be extendable or reducible based on an evaluation 222 provided by the viewer 114. Controls may be provided to the viewer 114 on the AR display 116 to capture the evaluation 222 while displaying the user content 108. The evaluation 222 may include binary options such as an approval 224 or a rejection 226. Alternatively, the approval 224 (or the rejection 226) may include a number based mechanism to rank the user content 108. The approval 224 may extend the time period by a fraction. The rejection 226 may reduce the time period by the fraction. A duration of the fraction may be a system setting. The duration may also be configured by a stakeholder associated with the AR service 106.

The duration of the fraction of the time period (used to extend or reduce the time period) may be determined by multiplying a default duration with a multiplication factor (such as 0 to 1). For example, a 60 second default duration associated with the fraction may be multiplied with a multiplication factor of 0.5 to come up with a 30 second duration to extend the time period. The multiplication factor of 0.5 may be calculated by dividing an example evaluation (score) of 5 with an example maximum available evaluation score of 10.

In an example scenario where the evaluation 222 provides a binary choice, the AR service 106 may receive a number of the approvals 224 or the rejections 226 from the viewer 114 and other viewers. The approvals 224 may exceed the rejections 226. The approvals 224 may also exceed a threshold value (above the number of the rejections 226). In such a scenario, the user content 108 may be marked as a fixture at the selected location 220. As such, the user content 108 may not be subject to the expiration 228. Furthermore, the user content 108 may always be rendered overlaid on the surface of the structure 218 (barring another event requiring removal of the user content 108).

In another example scenario, the rejections 226 may exceed the approvals 224. A number of the rejections 224 (that exceed the approvals 224) may reduce the time period to zero. For example, a time period of 60 seconds may be reduced to zero by 6 of the rejections 224 each worth 10 seconds. When the time period is reduced to zero, the user content 108 is removed from being rendered overlaid on the surface of the structure 218. The AR service 106 may continue to store the user content 108 (that is not rendered) for a limited period of time or indefinitely (based on a user preference or other criteria).

Figure 3:
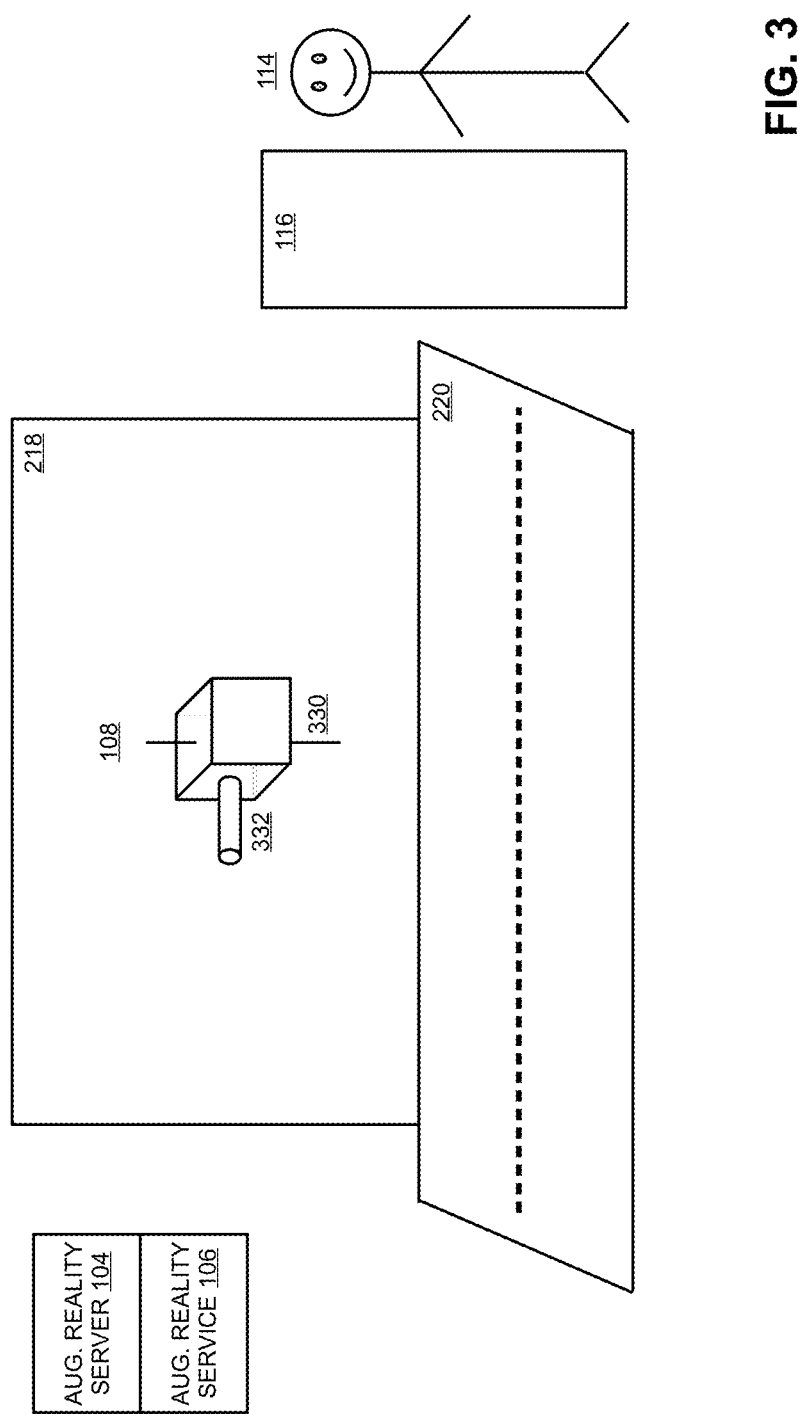
FIG. 3 shows a display diagram illustrating a three dimensional user generated content that is overlaid on a structure and subject to an expiration, according to an embodiment of the invention.

FIG. 3 shows a display diagram illustrating a three dimensional user generated content that is overlaid on a structure and subject to an expiration. The AR server 104 may execute the AR service 106 which may render the user content 108. The user content 108 may include a three dimensional article. The three dimensional article may include a text, a drawing, an image, an animation, an audio stream, and/or a video stream, among others. Entirety or parts of the three dimensional article may include three dimensional components. In an example scenario, the viewer may view the three dimensional article through the AR display 116 when in proximity to the structure 218 at the selected location 220. A user generating the three dimensional article may manually provide a placement information associated with the user content 108 in relation to the selected location 220. Alternatively, the placement of the user content 108 may be automatically determined by the AR service 106 with a mechanism similar to the example associated with the two dimensional article, previously described.

In an example scenario, a placement of the three dimensional article may be fixed in relation to a surface of the structure 218. For example, the user content 108 may be rendered for an overlay on a fixed position in front of the surface of the structure 218 at the selected location 220. The viewer 114 may be allowed to rotate the user content 108 (that is overlaid) on an axis 330. The rotation of the user content 108 may be applied to the user content 108 only during a viewing session by the viewer 114. Alternatively, the rotation may be permanently applied to the user content 108. The rotated state of the user content 108 may be made available for viewing by other users. The viewer 114 may also be able to rotate the user content 108 on other axis.

Alternatively, the three dimensional article may be positioned in between the viewer 114 and the surface of the structure 218 at the selected location 220. The three dimensional article may be automatically rotated to have a front section of the three dimensional article face the viewer 114 (while viewing through the AR display 116). In such a scenario, the viewer 114 may be prevented from rotating the user content 108 on an axis that moves or rotates the front section of the user content 108 away from the viewer 114. The user may designate the front section. Alternatively, the AR service 106 may automatically determine the front section based on an image and component recognition mechanism.

Furthermore, the viewer 114 may be allowed to update or add to the user content 108. In an example scenario, the viewer 114 may attach an additional content 332 to the user content 108. The additional content 332 may automatically be added to the user content 108 (upon passing content filters to remove indecent and/or inappropriate content). Alternatively, the AR service 106 may transmit a request (or a notification) to the user to authorize an update to the user content 108 with the additional content 332. If the user authorizes the additional content 332, the additional content 332 may be added to the user content 108 for rendering as overlaid on the surface of the structure 218. If the user rejects the additional content 332, the additional content 332 may be discarded. In a scenario that involves group art projects, members of a group that create (and/or modify) the user content 108 may automatically be allowed to add the additional content 332.

Figure 4:
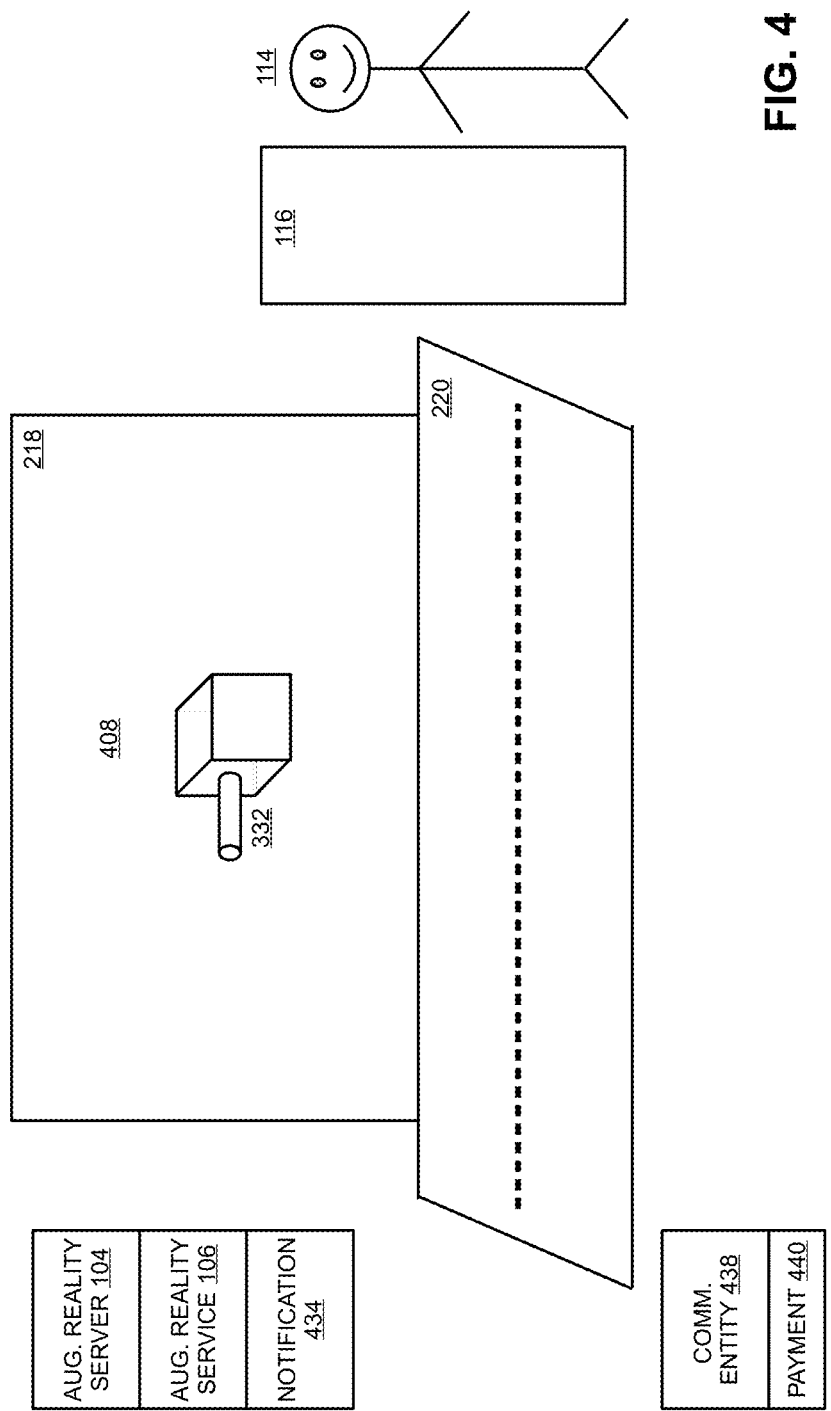
FIG. 4 shows a display diagram illustrating a commercial content that is overlaid on a structure and subject to an expiration, according to an embodiment of the invention.

FIG. 4 shows a display diagram illustrating a commercial content that is overlaid on a structure and subject to an expiration. In an example scenario, the AR server 104 may provide the AR service 106. The AR service 106 may receive and host a commercial content 408. The commercial content 408 may include a user content generated and/or provided by a commercial entity 438. The commercial entity 438 may include a creator, a marketing entity, and/or an owner of the commercial content 408, among others. The commercial entity 438 may provide a monetary incentive such as an initial payment for overlaying the commercial content 408 on the surface of the structure 218 at the selected location 332. The commercial content 408 (that is overlaid) on the surface of the structure 208 may also be subject to an expiration after a time period. However, the viewer 114 may not be allowed to evaluate the commercial content 408 while viewing through the AR display 116. The commercial entity 438 may extend the time period with a payment 440. An extension of the time period may cost more or less than the initial payment to overlay the commercial content 408 on the surface of the structure 408.

In an example scenario, the AR service 106 may detect a proximity of the expiration of the initial time period. An example of the proximity may include a duration (such as 24 hours, 1 week, and/or 1 month, among others) after which the commercial content 408 may expire and removed from an overlaid presentation on the structure 218. In response to the proximity of the expiration, the AR service may transmit a notification (434) that describes the expiration of the time period. In response to the notification 434, the AR service 106 may receive a notification of the payment 440 in relation to the commercial content. The payment 440 may be provided to extend the time period. As such, the initial time period may be extended with a duration related to the payment 440. For example, a small payment may extend the initial time period with a shorter duration, while a larger payment may extend the initial time period with a longer duration. An extension of the initial time period may be subject to a limit imposed by a stakeholder associated with the AR service 106.

In another example scenario, the viewer 114 may be allowed to edit or update the commercial content 408 with the additional content 332. However, the additional content 332 may be subject to an authorization mechanism associated with the commercial entity 438. For example, the AR service 106 may receive the additional content 332 from the viewer 114 intended for an integration with the commercial content 408. The AR service 106 may transmit a new instance of the notification 434, to the commercial entity 438, to approve or reject the additional content 332. In response to receiving an approval of the additional content 332 from the commercial entity 438, the AR service 106 may integrate the additional content 332 with the commercial content 408. In response to receiving a rejection of the additional content 332, the AR service may delete the additional content 332.

The example scenarios and schemas in FIGS. 1 through 4 are shown with specific components, data types, and configurations. Embodiments are not limited to systems according to these example configurations. An augmented reality based social network with time limited posting may be implemented in configurations employing fewer or additional components in applications and user interfaces. Furthermore, the example schema and components shown in FIGS. 1 through 4 and their subcomponents may be implemented in a similar manner with other values using the principles described herein.

Figure 5:
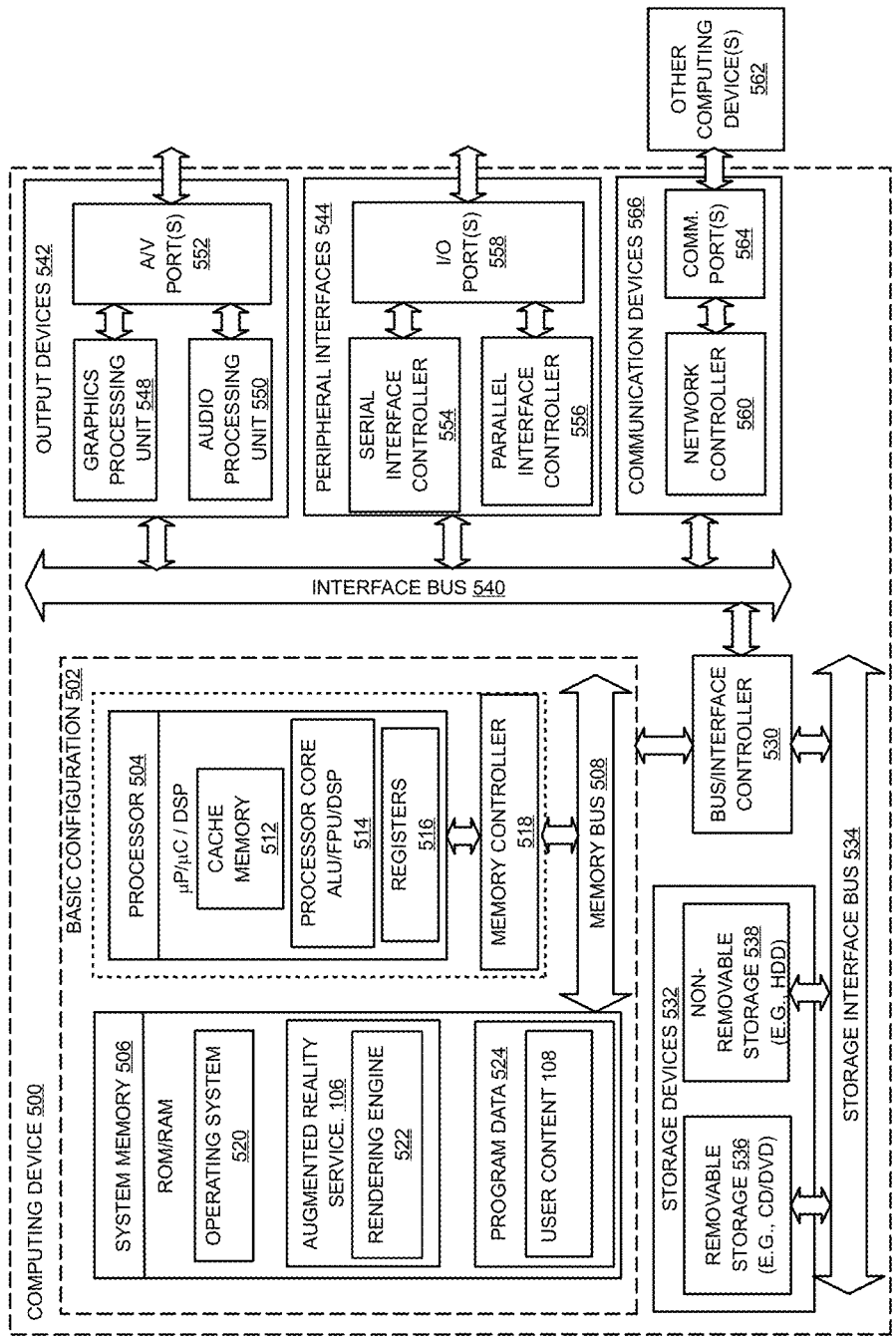
FIG. 5 is a block diagram of an example computing device, which may be used to provide an augmented reality based social network with time limited posting.

FIG. 5 is a block diagram of an example computing device, which may be used to provide an augmented reality based social network with time limited posting, according to embodiments.

For example, computing device 500 may be used as a server, desktop computer, portable computer, smart phone, special purpose computer, or similar device. In a basic configuration 502, the computing device 500 may include one or more processors 504 and a system memory 506. A memory bus 508 may be used for communication between the processor 504 and the system memory 506. The basic configuration 502 may be illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating-point unit (FPU), a digital signal processing core (DSP Core), a graphics processing unit (GPU), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.), or any combination thereof. The system memory 506 may store and provide an operating system 520, an AR service 106, and a program data 524. The AR service 106 may include components such as a rendering engine 522. The rendering engine 522 may execute the instructions and processes associated with the AR service 106. In an example scenario, the rendering engine 522 may receive and store a content generated by a user. A selected location may also be received from the user as an input. Next, the user content may be processed for overlay on the selected location. The user content may be subject to an expiration after a time period. Furthermore, the user content may be provided for a presentation on an augmented reality display in relation to the selected location. An initial evaluation of the user content may also be received from a viewer viewing the user content on the augmented reality display. The time period may be extended or reduced based on the evaluation.

Input to and output out of the AR service 106 may be transmitted through a communication device 566 that may be communicatively coupled to the computing device 600. The communication device 566 may provide wired and/or wireless communication. The program data 524 may also include, among other data, the user content 108 (or the commercial content 408), or the like, as described herein. The user content 108 (or the commercial content 408) may include a two dimensional or a three dimensional article, among other things.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example of the communication device(s) 566 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a specialized server, mainframe, or similar computer, which includes any of the above functions. The computing device 500 may also be implemented as a personal computer including both laptop computer and non-laptop computer configurations. Additionally, the computing device 500 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide an augmented reality based social network with time limited posting. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 6:
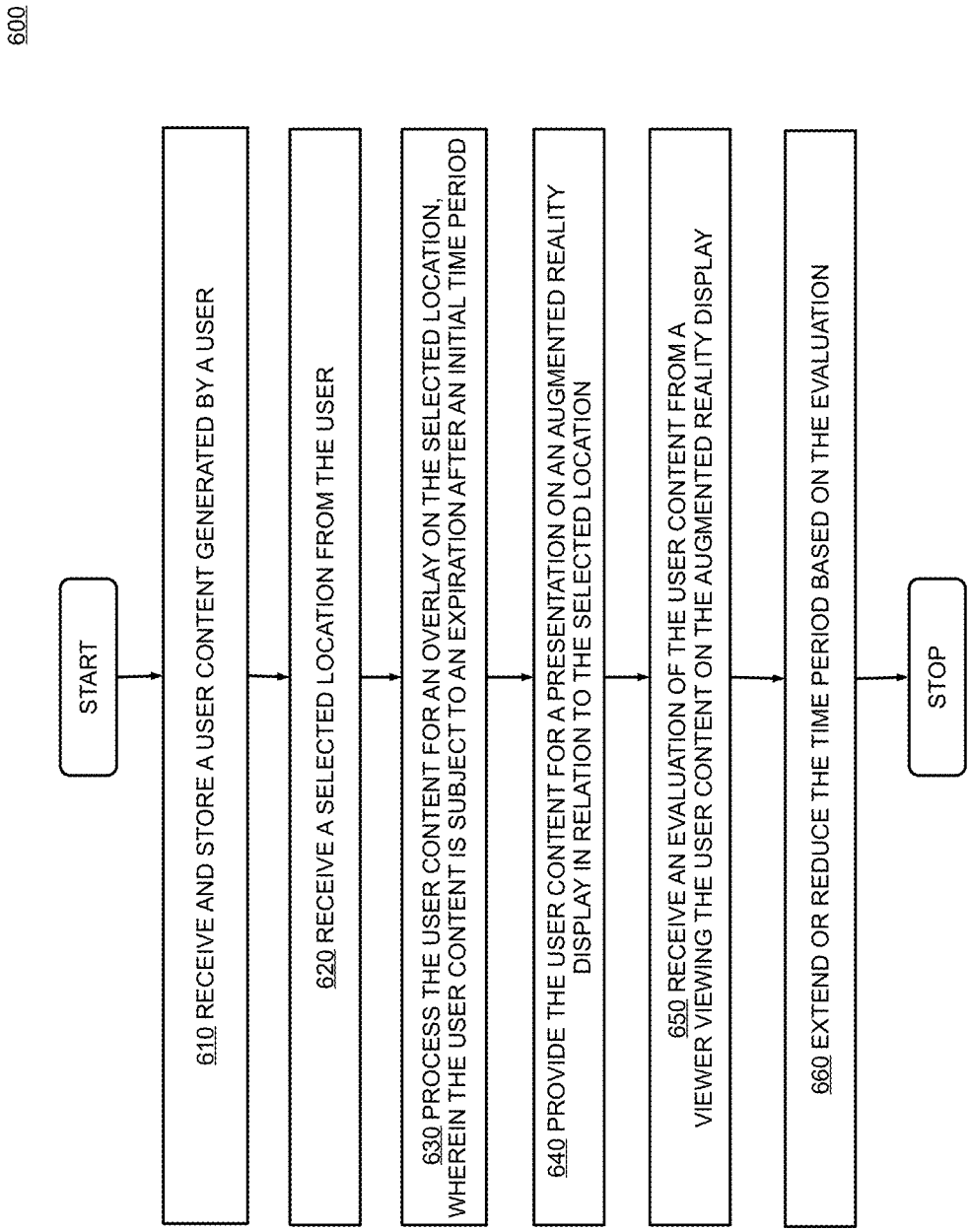
FIG. 6 is a logic flow diagram illustrating a process for providing an augmented reality based social network with time limited posting, according to an embodiment of the invention.

FIG. 6 is a logic flow diagram illustrating a process for providing an augmented reality based social network with time limited posting. Process 600 may be implemented on a computing device, such as the computing device 500 or another system.

Process 600 begins with operation 610, where an AR service may receive and store a content generated by a user. The user content may include two and/or three dimensional articles. At operation 620, a selected location may be received from the user as another input. The selected location may include a surface of a structure on which the user content may be intended for an overlay. Next, at operation 630, the user content may be processed for an overlay on the selected location. The user content may be subject to an expiration after a time period.

At operation 640, the user content may be provided for a presentation on an augmented reality display in relation to the selected location. A viewer may view the user content overlaid on the selected location through the AR display while stationary or travelling thorough the selected location. At operation 650, an evaluation of the user content may be received from a viewer viewing the user content on the AR display. The evaluation may include a binary option to approve or reject the user content. At operation 660, the time period may be extended or reduced based on the initial evaluation.

The operations included in process 600 is for illustration purposes. An augmented realty based social network with time limited posting may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

A method of providing an augmented reality based social network with time limited posting is also described. The method may include receiving and storing a content provided by a user. A selected location may also be received from the user as an input. The user content may next be processed for an overlay on the selected location. The user content may be subject to an expiration time. Furthermore, the user content may be provided for a presentation on an augmented reality display in relation to the selected location. In addition, an evaluation of the user content may be received from a viewer using the augmented reality display. In response, the time period may be expanded or reduced based on the evaluation.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations.

One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(es) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/ Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like. A beverages table including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. A Parameter table may include fields including the foregoing fields, or additional ones such as cool_start_time, cool_preset, cooling_rate, and/or the like. A Cool Routines table may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for providing an augmented reality based social network with time limited posting, the system comprising:
   an augmented reality server, wherein the augmented reality server is configured to:
      receive and store a user content generated by a user;
      receive a selected location from the user;
      process the user content for an overlay on the selected location, wherein the user content is subject to an expiration after an initial time period;
      provide the user content for a presentation on an augmented reality display in relation to the selected location;
      receive an initial evaluation of the user content from an initial viewer viewing the user content on the augmented reality display, wherein the initial evaluation includes a number based mechanism to rank the user content with an evaluation score; and
      extend or reduce the initial time period based on the initial evaluation by a fraction, wherein the fraction is computed from the evaluation score divided by a maximum evaluation score.

2. The system of claim 1, wherein the user content includes one or more of a text, a drawing, an image, an animation, an audio stream, or a video stream.

3. The system of claim 1, wherein the user content includes a two dimensional article rendered on a flat plane.

4. The system of claim 3, wherein a placement of the two dimensional article is fixed in relation to a surface of a structure at the selected location.

5. The system of claim 3, wherein
   the two dimensional article is positioned in between the viewer and a surface of a structure at the selected location, and wherein
   the flat plane is rotated to face the initial viewer.

6. The system of claim 1, wherein the user content includes a three dimensional article.

7. The system of claim 6, wherein
   a placement of the three dimensional article is fixed in relation to a surface of a structure at the selected location, and wherein
   the viewer is allowed to rotate the three dimensional article on one or more rotation axis.

8. The system of claim 6, wherein
   the three dimensional article is positioned in between the viewer and a surface of a structure at the selected location, and wherein
   the three dimensional article is rotated to have a front section face the viewer.

9. The system of claim 1, wherein the initial evaluation includes an initial approval of the user content.

10. The system of claim 9, wherein the augmented reality server is further configured to:
    receive other approvals of the user content from other viewers;
    detect a number associated with the initial approval and the other approvals exceed a threshold value; and
    mark the user content as a fixture at the selected location.

11. The system of claim 1, wherein the initial evaluation includes an initial disapproval of the user content.

12. The system of claim 1, wherein the augmented reality server is further configured to:
    receive other disapprovals of the user content from other viewers;
    reduce the time period to zero based on the initial disapprovals and the other disapprovals; and remove the overlay of the user content at the selected location.

13. A method of providing an augmented reality social network with time limited posting, the method comprising:
- receiving and storing a user content provided by a user;
- receiving a selected location from the user;
- processing the user content for an overlay on the selected location, wherein the user content is subject to an expiration time;
- providing the user content for a presentation on an augmented reality display in relation to the selected location;
- receiving an evaluation of the user content from a viewer using the augmented reality display, wherein the initial evaluation includes a number based mechanism to rank the user content with an evaluation score;
- extending or reducing the expiration time based on the evaluation by a fraction, wherein the fraction is computed from the evaluation score divided by a maximum evaluation score;
- receiving an update to the user content from the viewer;
- querying the user to confirm or reject the update; and
- revising the user content with the update based on a response from the user.

14. The method of claim 13, wherein the update includes an additional content provided by the viewer.

* * * * *